Nov. 22, 1927. Re. 16,794

W. C. HOMAN

LIQUID FUEL BURNER

Original Filed May 28, 1925

INVENTOR.
WILLIAM C. HOMAN.

BY Stockenage & Burt
HIS ATTORNEYS

Reissued Nov. 22, 1927. Re. 16,794

UNITED STATES PATENT OFFICE.

WILLIAM C. HOMAN, OF MERIDEN, CONNECTICUT, ASSIGNOR, BY MESNE ASSIGNMENTS, TO WILCOX PATENTS CORPORATION, OF PEEKSKILL, NEW YORK, A CORPORATION OF NEW YORK.

LIQUID-FUEL BURNER.

Original No. 1,573,549, dated February 16, 1926, Serial No. 33,334, filed May 28, 1925. Application for reissue filed November 17, 1926. Serial No. 148,966.

Heretofore among other features liquid fuel burners have been constructed to include a casing or shell, and a wick holder therein, adapted to retain a wick, and devices for raising and lowering the wick holder to adjust the wick to various positions. So far as I am aware, the devices heretofore employed for adjusting the wick to position have comprised various means for engaging the wick holder at one portion thereof. As commonly constructed the wick holders are made of sheet material, and are tubular in form, and consequently, by engaging one portion only of the wick holder to move the same within the casing there is a tendency to move the portion of the wick holder directly engaged to a greater extent than other portions thereof. It naturally follows that there is therefore created a tendency for the wick holder to wedge in the casing, and also the resultant effect of extending different portions of the edge of the wick different distances from the upper or outer edge of the casing. Obviously, this is the cause of producing an uneven flame.

The object of my present invention is to overcome the disadvantages to which reference has hereinbefore been made, and to provide in a liquid fuel burner a wick holder, and devices for actuating the same in such a manner that oppositely disposed portions of the wick holder are simultaneously engaged and uniformly moved so as to produce a right line movement in all parts of the wick holder, thereby preventing any tendency of the wick holder to wedge in the casing, and also insuring a uniform projection of the end of the wick beyond the peripheral portion of the casing to effect a resulting uniform flame from all portions of the wick when the burner is in use, as will be hereinafter more particularly described.

Figure 1:
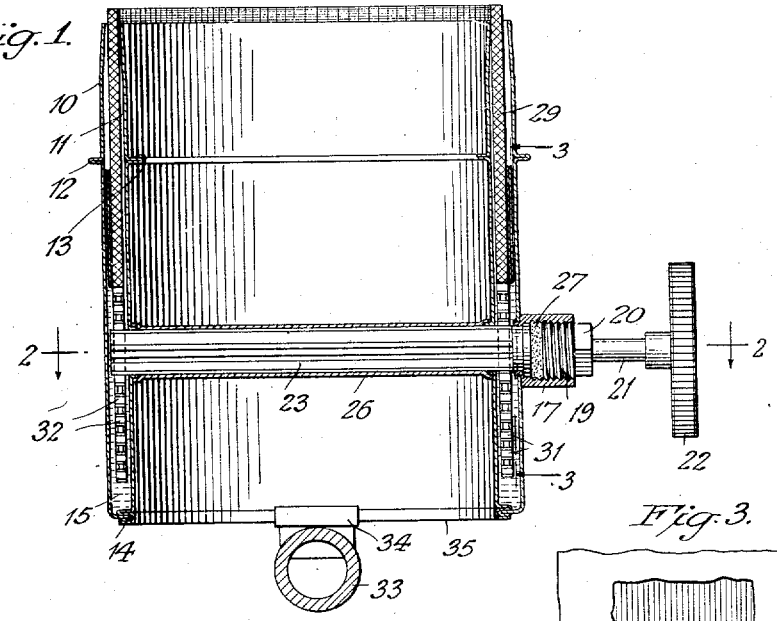
Fig. 1 is a sectional elevation of a liquid fuel burner made in accordance with my present invention.
Figure 3:
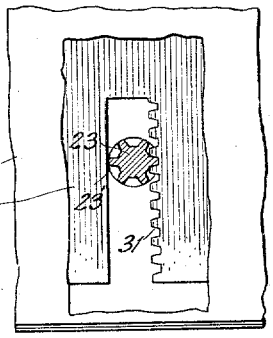
Fig. 3 is an enlarged sectional elevation on line 3—3, Fig. 1.

By reference to the drawing it will be seen that in carrying out the invention the liquid fuel burner made in accordance therewith comprises a casing having an outer wall 10, and an inner wall 11. In corresponding positions as illustrated the outer wall 10 may be provided with a rib 12, and the wall 11 with an internal rib 13, although the ribs 12 and 13 play no part in this invention. At the inner or lower ends the outer and inner walls 10 and 11 are suitably interlocked as indicated at 14 to connect these walls to one another in concentric relationship so as to provide between them an annular space 15 for a wick and wick holder as hereinafter described.

In a suitable position in the outer wall 10, the same is apertured and fitted with a ring 16; suitably connected to this ring 16 there is a tapped socket 17; fitting within the socket 17 and abutting against the outer face of the ring 16 I employ a collar 18. As illustrated, a portion of this collar is adapted to fit within the ring, and the collar is provided with a shoulder for engagement with the outer face of the ring. I also employ a plug 19 that is exteriorly screw threaded so as to be turned down into the socket 17, and at one end is provided with a head 20, which may be square as indicated, or hexagonal, or provided with any number of sides so as to be engaged by a wrench. The collar 18 and the plug 19 have centrally disposed bores therein through which a shaft 21 passes. At its outer end this shaft 21 is fitted with a hand wheel 22, which is preferably knurled, and by which the shaft and parts connected thereto may be readily turned in either one direction or the other.

The shaft 21 may be an integral part of a ribbed rod 23, or suitably connected thereto. The ribs on the rod are indicated at 23′, and as will be understood these ribs form a series of extended or elongated teeth. In a position in alignment with the ring 16 in the outer wall 10 the inner wall 11 is apertured as indicated at 24. In a substantially diametrically opposite position this inner wall 11 is similarly apertured at 25. These apertures 24 and 25 are of such a diameter as to receive and act as bearings for the end portions of the ribbed or toothed rod 23. Extending substantially diametrically across the inner wall 11 there is a sleeve 26, which surrounds and also acts as a bearing for a ribbed or toothed rod 23. As illustrated, the apertures 24 and 25 in the inner wall 11 may be defined by inwardly extending flanges, and the extremities of the sleeve 26 fitted over and secured to these flanges. It will be understood however, that this construction is merely illustrative, and may be made in any other suitable manner. Also as illustrated, the outer portion of the collar 18 and the inner end of the plug 19 may be suitably recessed so as to provide for a packing 27 to surround the shaft 21, and to make a tight joint between the same and these parts.

Figure 2:
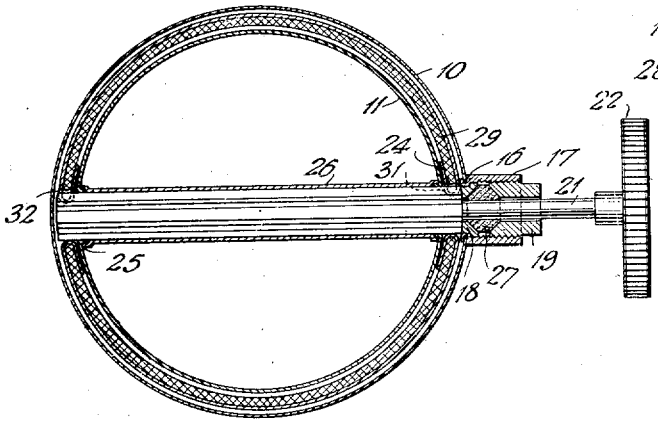
Fig. 2 is a section on the line 2—2, Fig. 1.
Figure 5:
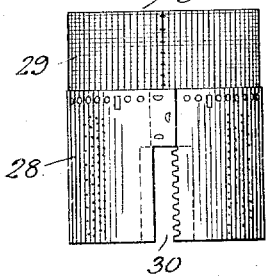
Fig. 5 is an elevation on a reduced scale, illustrating the wick holder and the wick contained therein.
Figure 4:
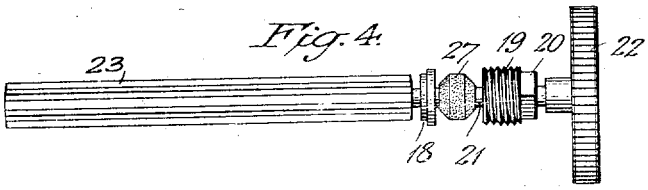
Fig. 4 is a plan of the spindle and associated parts employed for actuating the wick holder.

Between the outer and inner walls 10 and 11 there is a wick holder 28 with a wick 29 carried thereby. In oppositely disposed positions the wick holder 28 is slotted as indicated at 30. These slots extend longitudinally a predetermined distance, and corresponding edges defining like sides of the slots are provided with teeth 31 and 32 forming racks, which are simultaneously engaged by the end portions of the ribbed or toothed rod 23, which as will be understood act as pinions in engaging the teeth of these racks. The length of the ribbed or toothed portion of the rod 23 is substantially the same as the diameter of the outer wall 10, so that as clearly shown in Figs. 1 and 2 of the drawing the extremities of the ribbed or toothed portion of the rod engage the teeth 31 and 32, as hereinbefore stated.

It will now be understood that as the shaft 21 is turned the teeth 23′ engage the teeth 31 and 32 of the wick holder simultaneously, and consequently, there is a corresponding motion imparted at the same time to oppositely disposed sections of the wick holder. This causes a uniform motion in either direction of the wick holder between the outer and inner walls, and a corresponding motion of the wick, resulting as will be appreciated in the outer end of the wick extending uniformly in all its parts from the outer peripheral portion of the casing. Furthermore, as will also be appreciated this results in preventing the wick holder from any tendency to wedge, and also results in a uniform flame from all parts of the wick.

Although forming no part of the invention, the liquid fuel burner as illustrated, may be supported from a supply pipe 33, by which the fuel to be burned is conveyed to the wick, and a bracket 34 extending between the supply pipe and a suitable support 35 or otherwise.

I claim as my invention:

1. In a liquid fuel burner, a casing, a wick holder therein, the said wick holder being provided in diametrically opposite positions with longitudinal slots, and devices extending centrally through the casing and engaging the edges defining the sides of the said slots in the wick holder for simultaneously imparting a uniform movement to the said wick holder.

2. In a liquid fuel burner, a casing, a wick holder therein, the said wick holder being provided in diametrically opposite positions with longitudinal slots, racks formed along corresponding edges defining like sides of the slots in the wick holder, and means extending centrally through said casing and engaging the said racks simultaneously to move the wick holder from opposite sides thereof.

3. In a liquid fuel burner, a casing, a wick holder therein, the said wick holder being provided in diametrically opposite positions with longitudinal slots, racks formed along corresponding edges defining like sides of the slots in the wick holder, a toothed rod for engaging the teeth of the said racks, and means for turning the said rod to cause the teeth thereon to simultaneously engage the said racks, and thereby uniformly move the said wick holder in either direction.

4. In a liquid fuel burner, a casing comprising an inner wall and an outer wall, a wick holder movable between the said walls, the said wick holder having oppositely disposed longitudinal slots at the inner end thereof, racks in the corresponding edges defining the said slots in the wick holder, a toothed rod extending across the casing and passing through apertures provided therefor in the inner wall of the casing to engage the teeth in the said racks, and means for turning the said rod to simultaneously engage the said racks, to impart a uniform movement to oppositely disposed portions of the said wick holder.

5. In a liquid fuel burner, a casing comprising an inner wall and an outer wall, a wick holder movable between the said walls, the said wick holder having oppositely disposed longitudinal slots at the inner end thereof, racks in the corresponding edges defining the said slots in the wick holder, a toothed rod extending across the casing and passing through apertures provided therefor in the inner wall of the casing to engage the teeth in the said racks, a shaft extending from the said toothed rod through the outer wall of the casing, and means for making a tight joint between the outer wall and the said shaft.

6. In a liquid fuel burner, a casing comprising an inner wall and an outer wall, a wick holder movable between the said walls, the said wick holder having oppositely disposed longitudinal slots at the inner end thereof, racks in the corresponding edges defining the said slots in the wick holder, a toothed rod extending across the casing and passing through apertures provided therefor in the inner wall of casing to engage the teeth in the said racks, a shaft extending from the said toothed rod through the outer wall of the casing, a sleeve surrounding the said toothed rod and extending across the inner wall of the casing and connected thereto, and means for making a tight joint between the outer wall and the said shaft.

7. In a liquid fuel burner, a longitudinally movable tubular wick holder and a single wick operating device extending across said wick holder and intersecting said holder at two spaced points, said device being provided with means for engaging the wick holder at substantially diametrically opposite points.

8. In a liquid fuel burner, a longitudinally movable tubular wick holder and a wick operating device consisting of a splined shaft extending across said wick holder and intersecting said holder at two spaced points, said shaft being adapted to engage the wick holder at substantially diametrically opposite points.

9. In a liquid fuel burner, a longitudinally movable tubular wick holder and a single rotary wick operating device extending across said wick holder and intersecting said holder at two spaced points, said device being provided with teeth at its opposite ends for engaging the wick holder at substantially diametrically opposite points.

10. In a liquid fuel burner, a casing, a tubular wick holder longitudinally movable therein, and a single wick-operating device extending across said casing and intersecting said holder at two spaced points, said device being provided with means for engaging said wick holder at substantially diametrically opposite points.

11. In a liquid fuel burner, a casing a tubular wick holder longitudinally movable therein and a single rotary wick-operating device extending across said casing and intersecting said holder at two spaced points, said device being provided with teeth at its opposite ends for engaging said wick holder at substantially diametrically opposite points.

12. In a liquid fuel burner, a casing, a tubular wick holder therein having vertically extending racks on opposite sides thereof, and a rotary wick-operating device extending across said casing and extending through said racks said device being provided with teeth at its opposite ends for engaging said racks.

WILLIAM C. HOMAN.